(12) United States Patent
Dutta

(10) Patent No.: US 12,009,984 B2
(45) Date of Patent: Jun. 11, 2024

(54) TARGETED NEIGHBOR DISCOVERY FOR BORDER GATEWAY PROTOCOL

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/030,085

(22) Filed: Sep. 23, 2020

(65) Prior Publication Data

US 2022/0094601 A1 Mar. 24, 2022

(51) Int. Cl.
*H04L 41/12* (2022.01)
*H04L 67/141* (2022.01)
*H04L 12/66* (2006.01)

(52) U.S. Cl.
CPC ............ *H04L 41/12* (2013.01); *H04L 67/141* (2013.01); *H04L 12/66* (2013.01)

(58) Field of Classification Search
None
See application file for complete search history.

(56) References Cited

U.S. PATENT DOCUMENTS

| | | | | |
|---|---|---|---|---|
| 9,602,354 | B1 * | 3/2017 | Esale | H04L 45/74 |
| 10,887,225 | B1 * | 1/2021 | Chan | H04L 45/02 |
| 2007/0097974 | A1 * | 5/2007 | Ward | H04L 45/46 |
| | | | | 370/465 |
| 2011/0096780 | A1 * | 4/2011 | Darwish | H04L 45/507 |
| | | | | 370/392 |
| 2013/0007484 | A1 * | 1/2013 | Gobriel | G06F 1/3287 |
| | | | | 713/320 |
| 2015/0312055 | A1 * | 10/2015 | Varga | H04L 12/4633 |
| | | | | 370/254 |
| 2016/0050147 | A1 * | 2/2016 | Zhang | H04L 45/02 |
| | | | | 370/392 |
| 2016/0182358 | A1 * | 6/2016 | Peter | H04L 45/74 |
| | | | | 370/315 |

(Continued)

OTHER PUBLICATIONS

RFC 8277 Using BGP to bind MPLS labels to address prefixes (Oct. 2017) to Rosen et al. ("Rosen") (Year: 2017).*

(Continued)

*Primary Examiner* — June Sison
(74) *Attorney, Agent, or Firm* — Tong, Rea, Bentley & Kim, LLC

(57) ABSTRACT

A first router receives a targeted message that is unicast from a second router that is multiple network hops away from the first router. The first router establishes a transport layer connection between the first router and the second router in response to the targeted message. The first router then establishes a session over the transport layer connection. The session operates according to a border gateway protocol (BGP). In some cases, the targeted message includes information such as an IP address of the first router, a transport layer parameter, an ASN associated with the second router, and an identifier of the routing protocol associated with the second router. A frequency of targeted messages exchanged by the first and second routers is reduced in response to a duration of the session increasing and turned off if the duration exceeds a threshold duration.

8 Claims, 11 Drawing Sheets

(56) References Cited

U.S. PATENT DOCUMENTS

2016/0277463 A1* 9/2016 Nagarajan ............... H04L 45/16
2018/0077060 A1 3/2018 Nagarajan et al.
2020/0389360 A1* 12/2020 Boucadair .......... H04L 41/0886
2022/0239588 A1* 7/2022 Malhotra ................ H04L 45/74

OTHER PUBLICATIONS

IETF draft-xu-idr-neighbor-autodiscovery-12 "BGP Neighbor Discovery" (Nov. 26, 2019) to Xu et al. ("Xu") (Year: 2019).*
IETF draft-pdutta-mpls-tldp-hello-reduce-04 "T-LDP Hello Reduction" (Sep. 2012) to Dutta et al. ("Dutta-IETF") (Year: 2012).*
IETF RFC 5036 LDP Specification (Oct. 2007) to Andersson et al. ("Andersson") (Year: 2007).*
IETF RFC 6074 Provisioning, Auto-Discovery, and Signaling, in Layer 2 Virtual Private Networks (L2VPNs) (Jan. 2011) to Rosen et al. ("Rosen") (Year: 2011).*
"Transmission Control Protocol, DARPA Internet Program, Protocol Specification", RFC 793, Sep. 1981, 89 pages.
Bates et al, "Multiprotocol Extensions for BGP-4", Network Working Group, RFC 4760, Jan. 2007, 12 pages.
Gredler et al., "North-Bound Distribution of Link-State and Traffic Engineering (TE) Information Using BGP", Internet Engineering Task Force (IETF), RFC 7752, Mar. 2016, 48 pages.
Lapukhov et al., "Use of BGP for Routing in Large-Scale Data Centers", Internet Engineering Task Force (IETF), RFC 7938, Aug. 2016, 35 pages.
Patel et al., "Shortest Path Routing Extensions for BGP Protocol", Network Working Group, Internet-Draft, Mar. 24, 2020, 22 pages.
Rekhter et al, A Border Gateway Protocol 4 (BGP-4), Network Working Group, RFC 4271, Jan. 2006, 104 pages.
Talaulikar et al, "BGP Link-State Extensions for BGP-only Fabric", Inter-Domain Routing, Internet-Draft, Sep. 3, 2018, 21 pages.
Xu et al., "BGP Neighbor Discovery", Network Working Group, Internet-Draft, Oct. 22, 2018, 33 pages.
Dutta, P., et al., "Targeted LDP Hello Reduction," draft-pdutta-mpls-tldp-hello-reduce-04, Network Working Group, Sep. 1, 2012, 8 pages.
Extended European Search Report mailed in corresponding EP 21198091.7 dated Feb. 11, 2022, 16 pages.
Notice of Reasons for Refusal mailed in corresponding JP Application No. 2021-151642 dated Nov. 22, 2022, 8 pages.

* cited by examiner

TARGETED NEIGHBOR DISCOVERY FOR BORDER GATEWAY PROTOCOL

BACKGROUND

The border gateway protocol (BGP) is a control plane protocol for exchanging routing information over networks, e.g., between autonomous systems (AS). Network layer reachability information (NLRI) can be exchanged using BGP to also set up different types of virtual private networks (VPNs) including layer-2 and layer-3 VPNs, multiprotocol label switching (MPLS) over label switched paths (LSPs), and the like. The BGP peering between a pair of BGP routers is referred to as a BGP session and the peering BGP routers can be directly connected or connected over multiple hops in the network. A BGP session between two routers in the same AS is referred to as an internal BGP (i-BGP) and a BGP session between routers in different ASes is referred to as an external BGP (e-BGP), which is used as an exterior gateway protocol to exchange routing information among the different ASes. A BGP session runs as an application over the transmission control protocol (TCP), which provides lossless, reliable, and in-order delivery of BGP messages in the BGP session. The peering BGP routers exchange keep-alive messages at predetermined time intervals to maintain the liveliness of the session.

BGP is used as a control plane protocol in a large scale data center to support network virtualization overlays, e.g., virtual extensible LAN (VXLAN), network virtualization using generic routing encapsulation (NVGRE), and MPLS over user datagram protocol (MPLSoUDP) based overlays. BGP can also be leveraged as an underlay routing protocol instead of link-state routing protocols like IS-IS and OSPF in some large-scale data centers. Conventional link state protocols compute paths using a Shortest-Path-First (SPF) algorithm. Consequently, all traffic between a source and a destination follows the same SPF path, which does not provide the flexibility of routing required within a data center. In a data center, the network topologies grow (scale out horizontally) frequently due to continual addition of servers and other systems into the network. BGP supports policy-based routing so that traffic can be routed along different paths based on policies associated with different types of traffic. This aspect of BGP is one reason for its deployment as an underlay routing protocol in data centers. Some embodiments of BGP also support link-state and SPF capabilities like IS-IS and OSPF.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
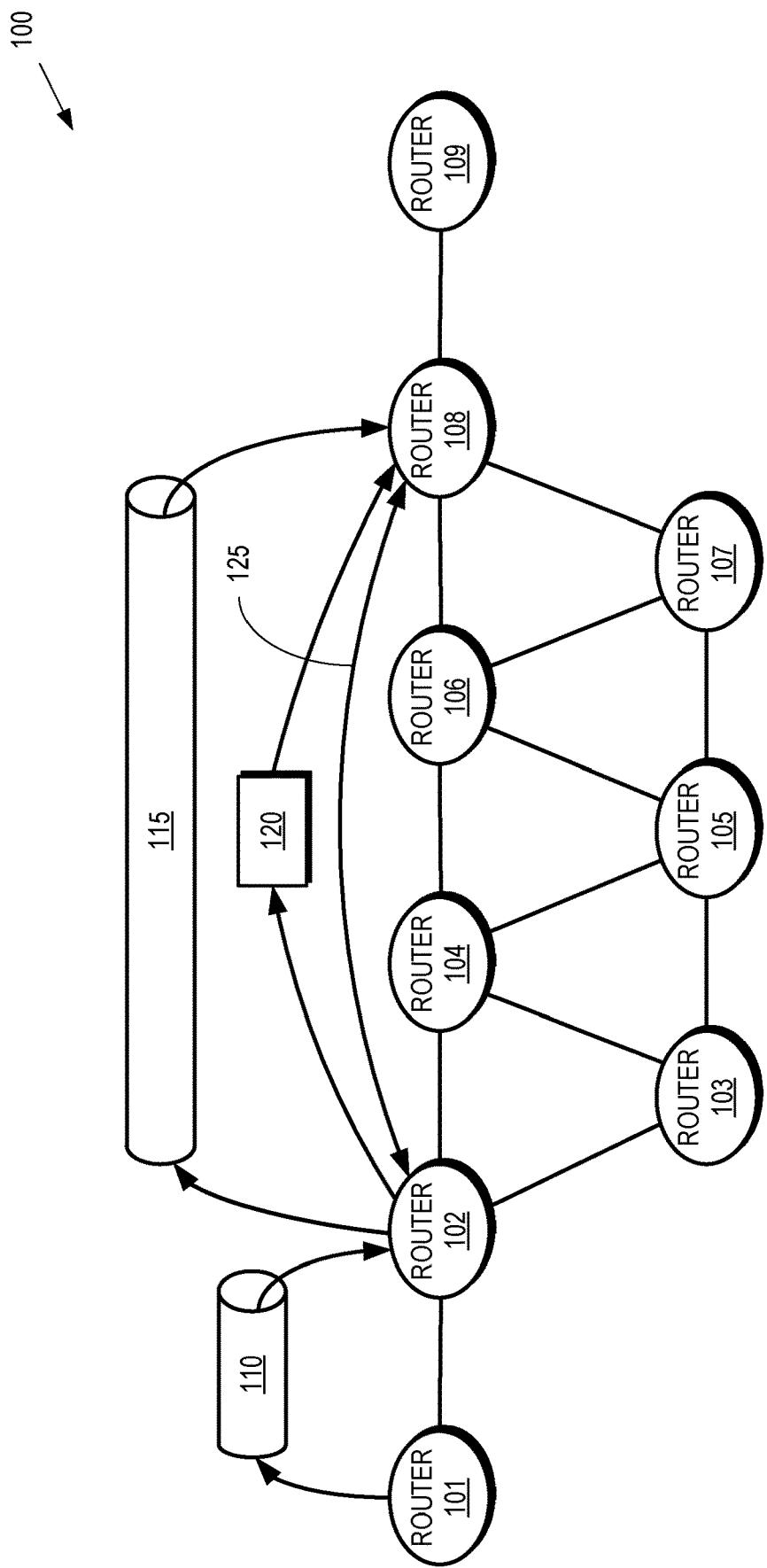
FIG. 1 is a block diagram of a network that implements targeted neighbor discovery for establishing multi-hop border gateway protocol (BGP) sessions according to some embodiments.

Many data centers leverage the border gateway protocol (BGP) as an underlay routing protocol that supports flexible policy-based routing. BGP is preferable to other link-state routing protocols such as open shortest path first (OSPF, OSPFv3) and intermediate system-to-intermediate system (IS-IS) because these link-state protocols force all traffic between a source and a destination to follow the same path. A BGP session runs as an application atop a transport layer protocol such as transmission control protocol (TCP), which provides lossless, reliable, in-order delivery of BGP messages. Leaf routers are allocated different autonomous system numbers (ASNs) and a single ASN is allocated to all the spine routers in the spine. BGP sessions are formed between the entities associated with each ASN. To form BGP sessions, a BGP router performs neighbor discovery to determine a neighbor Internet protocol (IP) address and an autonomous system (AS) for each BGP neighbor on all links of the BGP router, as well as generating and distributing information such as the router's AS, liveliness of the neighbor routers/spines, link attributes such as addresses, a maximum transfer unit (MTU), and the like. The BGP router initiates neighbor discovery by multicasting a "Hello" message on all its links. The Hello message includes the ASN and the BGP identifier of the router, a hold time for the Hello message, and, in some cases, one or more Type-Length-Values (TLVs) to represent other parameters. Neighboring BGP routers establish a TCP connection in response to one of the BGP routers receiving a Hello message from the other BGP router and establishing adjacency between the BGP routers. The BGP session is then established over the top of the TCP connection.

Conventional BGP neighbor discovery only discovers neighbors that are directly connected over a single link or hop. Routers attempting to establish BGP sessions over multiple hops are unable to discover each other using conventional BGP neighbor discovery, which introduces several drawbacks. Conventional BGP neighbor discovery does not provide a mechanism to negotiate transport parameters between multi-hop BGP peers prior to establishment of a TCP connection between the BGP peers. Examples of the transport parameters include stack preferences in peers that support dual stacks (IPv4 and IPv6), a local IP address used by a BGP router for the peering session, and the like. Single-sided provisioning, e.g., to support a route reflector that has peering with all BGP routers in an AS, cannot be implemented if routers are only able to discover neighbors over a single link because single link discovery leads to a mesh network. In addition, some routers in a single-sided provisioning scenario are not able to discover the route reflector if it is more than one hop away. Another drawback to conventional BGP neighbor discovery is that negotiation of an underlying transport protocol cannot be performed without a discovery mechanism that operates prior to establishment of the BGP session because the BGP session is run over the transport protocol.

FIGS. 1-14 disclose embodiments of multi-hop border gateway protocol (BGP) neighbor discovery that are performed using targeted neighbor discovery messages unicast by routers performing targeted neighbor discovery. In some embodiments, a first router receives a targeted neighbor discovery message that is unicast from a second router that is multiple hops away from the first router. The targeted neighbor discovery message includes an IP address that is monitored by the first router and transport layer parameters, as well as an autonomous system number (ASN) and BGP identifier of the second router. Examples of the transport layer parameters include IP addresses for a transport layer connection between the first and second routers. The first router evaluates the transport layer parameters and, if the parameters are acceptable, forms a targeted adjacency with the second router. As used herein, the term "acceptable" refers to parameters that are shared by or compatible with the operation of the first and second routers. For example, the second router can transmit information indicating parameters such as timeout intervals and the first router determines that the proposed parameters are acceptable if they are shared by or compatible with the operation of the first router.

A transport layer connection is established based on the negotiated transport layer parameters in response to forming the targeted adjacency. In some embodiments, the transport layer connection is a transmission control protocol (TCP) connection established using the IP addresses associated with the first and second routers. The BGP session is then formed over the transport layer connection. In some embodiments, the first router is a passive router that does not unicast targeted neighbor discovery messages and the second router is an active router that unicasts targeted messages to establish adjacencies. For example, the first router can be configured as a passive router that acts as a route reflector within an AS that includes the second router and one or more additional active routers. The first and second routers periodically exchange session keep-alive messages to indicate that the BGP session is active. In some embodiments, transmission of the targeted neighbor discovery messages becomes redundant after the BGP session is operational because session keep-alive messages allow the routers to maintain peer adjacencies. Consequently, in some embodiments, the frequency of the targeted neighbor discovery messages is reduced and, in some cases, turned off as a duration of the targeted adjacency increases.

FIG. 1 is a block diagram of a network 100 that implements targeted neighbor discovery for establishing multi-hop border gateway protocol (BGP) sessions according to some embodiments. The network 100 includes a set of routers 101, 102, 103, 104, 105, 106, 107, 108, 109, which are collectively referred to herein as "the routers 101-109." The routers 101-109 establish sessions for communication based on a routing protocol that supports policy-based routing such as BGP, which is a widely used control plane protocol to exchange routing information, especially between autonomous systems (ASes). Some embodiments of BGP are extended to support the exchange of network layer reachability information (NLRI) that is used to set up different types of layer-3, layer-2 virtual private networks (VPNs), multiprotocol label switching (MPLS) over label switched paths (LSPs), and the like. The extended version of BGP is referred to as a Multi-Protocol BGP (MP-BGP).

The routers 101-109 use the information exchanged via BGP to establish BGP peering between a pair of BGP routers. The BGP peering is also referred to as a BGP session. The peering BGP routers can be directly connected or could be multiple hops away. In the illustrated embodiment, the BGP session 110 between the routers 101 and 102 is a single hop session because the routers 101, 102 are directly connected by a link. The BGP session 115 between the routers 102 and 108 is a multi-hop session because the BGP session 115 traverses multiple routers, e.g., the routers 104, 106.

The BGP sessions 110, 115 run as applications over a transport layer protocol such as the transmission control protocol (TCP), which provides lossless, reliable, and in-order delivery of BGP messages in a session. To create a BGP session, the peering BGP routers are configured to create a TCP session on a predetermined port number such as the port number 179, which indicates BGP as the application atop TCP. Once the TCP connection is operational, the peering BGP routers establish the BGP session over the TCP connection. After a BGP session is established, the peering routers can exchange reachability information (as messages) over the BGP session. In some embodiments, a BGP router periodically sends 19-byte keep-alive messages every 60 seconds over the BGP session to maintain the session. The BGP routers can also transmit different sizes of keep-alive messages at different time intervals or in response to events. A BGP session between two routers in the same autonomous system (AS) is referred to as Internal BGP (i-BGP). A BGP session between routers in different ASes is referred to as an External BGP (e-BGP).

In some embodiments, BGP is used as an exterior gateway protocol to exchange routing information among ASes. In other embodiments, BGP is used as a control plane protocol in a large scale data center to support network virtualization overlays, e.g., virtual extensible LAN (VXLAN), network virtualization using generic routing encapsulation (NVGRE), and MPLS over user datagram protocol (MPLSoUDP) based overlays. BGP can also be leveraged as an underlay routing protocol instead of link-state routing protocols like IS-IS and OSPF in some large-scale data centers. Conventional link state protocols compute paths using a Shortest-Path-First (SPF) algorithm. Consequently, all traffic between a source and a destination follows the same SPF path, which does not provide the flexibility of routing required within a data center. In a data center, the network topologies grow (scale out horizontally) frequently due to continual addition of servers and other systems into the network. BGP supports policy-based routing so that traffic can be routed along different paths based on policies associated with different types of traffic. This aspect of BGP is one reason for its deployment as an underlay routing protocol in data centers. Some embodiments of BGP also support link-state and SPF capabilities like IS-IS and OSPF.

Conventional implementations of BGP do not support dynamic discovery of neighbours in BGP that are multiple hops away. Information about each multi-hop neighbor should be explicitly configured in the router, which establishes a TCP connection to each neighbour based on the multi-hop neighbor information. Subsequently, the router establishes the BGP session over the TCP connection. Neighbor discovery in conventional BGP is limited to dynamic discovery of neighbors that are directly connected over a single link or hop. During neighbor discovery, information that represents the neighbors connected to a router over a single link or hop are multicast by neighbors. The information identifying the neighbors is then configured in the router. Examples of the information identifying the neighbors include an IP address associated with the neighbor, a BGP identifier of the router, attributes of the link at the neighbor's end and the like. Based on the information for the discovered neighbors, the router establishes a TCP connection to each neighbour and subsequently establishes the BGP session over the TCP connection. Routers attempting to establish BGP sessions over multiple hops are unable to discover each other using conventional BGP neighbor discovery. Consequently, as discussed herein, conventional BGP neighbor discovery does not provide a mechanism to negotiate transport parameters between multi-hop BGP peers prior to establishment of a TCP connection between the BGP peers as well as giving rise to other drawbacks.

At least in part to address the aforementioned drawbacks in the conventional implementations of BGP, some embodiments of the routers 101-109 implement targeted neighbor discovery that can identify neighbors that are more than one link or hop away. For example, the router 102 can unicast a targeted neighbor discovery message 120 to the router 108 to initiate multi-hop neighbor discovery. The targeted neighbor discovery message 120 includes information such as an IP address of the router 108, a transport layer parameter, an ASN associated with the router 102, an indication of the network layer protocol (e.g., IPv4 or IPv6), and a BGP identifier associated with the router 102. On receipt of the message 120, the router 108 forms a targeted adjacency 125 with the router 102. The router 108 establishes a transport layer connection with the router 102 in response to the targeted adjacency 125 created by the targeted neighbor discovery message 120. The router 108 then establishes the BGP session 115 session over the transport layer connection. In some embodiments, the routers 102, 108 exchange session keep-alive messages to indicate that the BGP session 115 is active. In some embodiments, after the BGP session is operational, the periodic targeted neighbor discovery messages between the routers become redundant because the session keep-alive messages maintain the adjacency 125 to the peer router. A frequency of the targeted neighbor discovery messages exchanged by the routers 102, 108 can be reduced in as a duration of the targeted adjacency 125 increases.

response to a duration of the BGP session 115 increasing. In some cases, transmission of the targeted keep-alive messages is turned off in response to the duration of the BGP session 115 exceeding a threshold duration.

Figure 2:
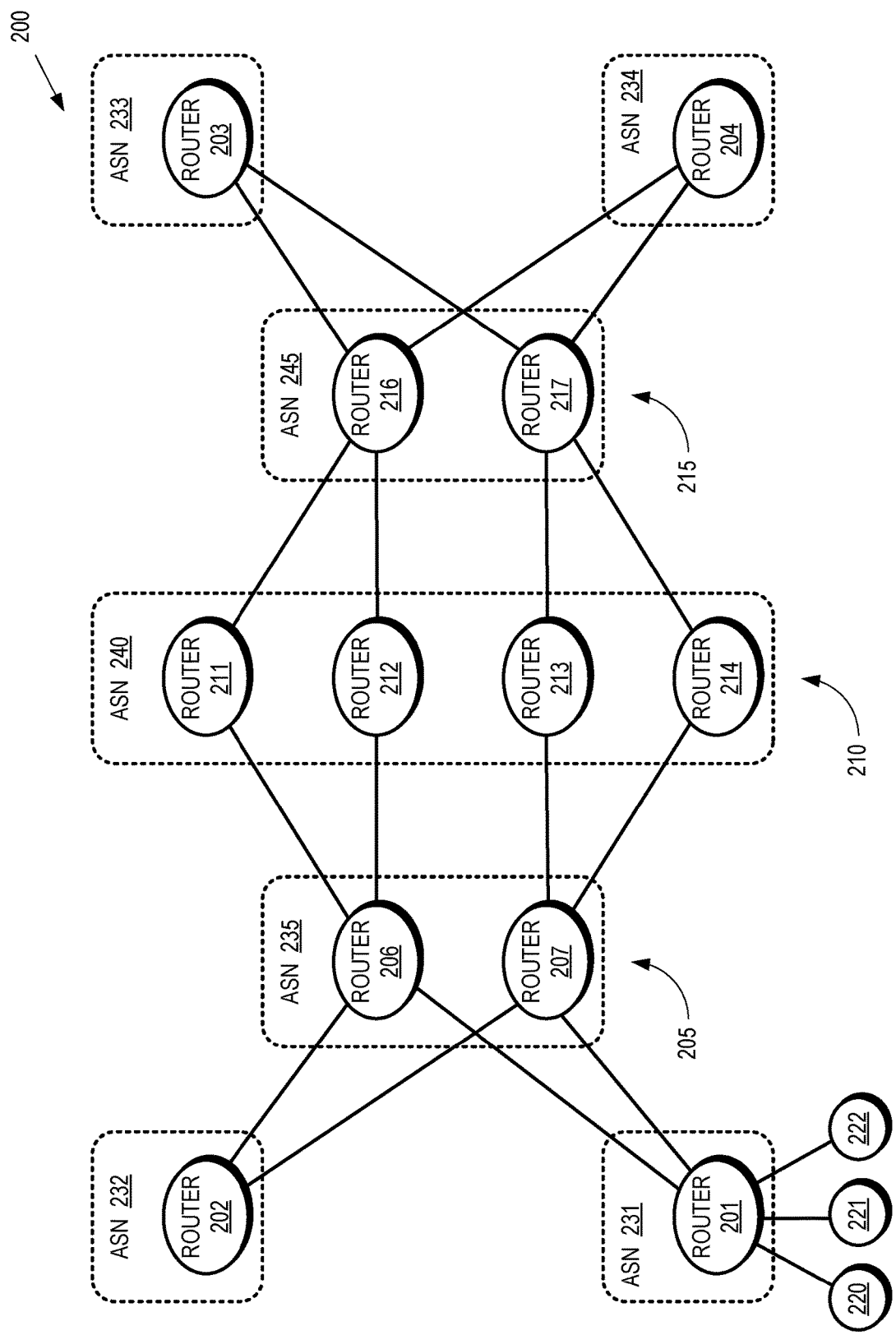
FIG. 2 is a block diagram of a 5-stage Clos network according to some embodiments.

FIG. 2 is a block diagram of a 5-stage Clos network 200 that implements link level neighbor discovery for establishing single-hop BGP sessions according to some embodiments. The 5-stage Clos network 200 is implemented in a leaf-and-spine topology that interconnects leaf routers via one or more spines that includes spine routers. In the illustrated embodiment, the 5-stage CLOS network 200 includes four leaf routers 201, 202, 203, 204 (collectively referred to herein as "the leaf routers 201-204") that are interconnected by spines 205, 210, 215. The spine 205 includes the routers 206, 207, the spine 210 includes the routers 211, 212, 213, 214, and the spine 215 includes the routers 216, 217. The leaf routers 201-204 provide connections to one or more servers such as the servers 220, 221, 222 that are connected to the leaf router 201. The numbers of routers, spines, spine routers, and servers shown in FIG. 2 are chosen for illustrative purposes. Some embodiments of the network 200 include more or fewer leaf routers, spines, spine routers, and servers. Furthermore, the numbers of entities in the network 200 can change dynamically due to the addition or removal of one or more routers, spines, spine routers, or servers.

The leaf routers 201-204 are redundantly connected to two or more spine routers. In the illustrated embodiment, the leaf router 201 is redundantly connected to the spine routers 206, 207 and the leaf router 202 is redundantly connected to the spine routers 206, 207. The leaf router 203 is redundantly connected to the spine routers 216, 217 and the leaf router 204 is redundantly connected to the spine routers 216, 217. Spine routers in different spines are also redundantly connected. In the illustrated embodiment, the spine router 206 is redundantly connected to the spine routers 211, 212 and the spine router 207 is redundantly connected to the spine routers 213, 214. The leaf routers 201-204 are not interconnected and the spine routers within a spine are not interconnected in a Clos topology. The servers 220-222 are therefore connected to other servers associated with other leaf routers 202-204 by no more than five hops.

Autonomous system numbers (ASNs) are allocated to leaf routers and spines. In the illustrated embodiment, the autonomous system numbers 231, 232, 233, 234 (collectively referred to herein as "the ASN 231-234") are allocated to the leaf routers 201-204, respectively. The ASN 235, 240, 245 are allocated to the spines 205, 210, 215, respectively. In some embodiments, the ASN 231-234, 235, 240, 245 are allocated from a Private Use ASN space that includes a predetermined set of available ASN such as the ASN having values in the range 64512-65534. The routers 201-204, 206, 207, 211-214, 216, 217 in the 5-stage Clos network 200 implement and operate according to BGP. A pair of directly connected routers always belong to different ASes in the topology of the 5-stage Clos network 200, so sessions between them are established as external BGP sessions.

Neighbor provisioning in BGP configures the neighbor IP address and AS for the BGP neighbor on the links of the BGP routers. Thus, BGP provisioning is carefully updated in response to growth of a data center fabric in response to addition of new leafs, spines, and links between them. For example, if a new leaf router is connected to the spine 205 in response to deploying a new server rack, the new leaf router needs to be configured for e-BGP sessions with the routers 206, 207 and each of the routers 206, 207 needs to be configured for an e-BGP session with the leaf router. In some embodiments, hundreds of leaf routers are added to the spine 205 and the addition of each leaf router requires explicit configuration for e-BGP peering.

Furthermore, in BGP deployments in large-scale data centers, BGP should be able to describe its links and its neighbors on its directly connected links and export this information via BGP-LS to provide a detailed view of the link-level topology of the data center running BGP. The ability of BGP to discover its neighbors over its links, monitor their liveliness, and learn the link attributes (such as addresses) is required for conveying the link-state topology in such a BGP network. This information can be leveraged to support link-state routing capabilities in BGP. This information can also be leveraged to convey the link-state topology in a network running traditional BGP routing and to enable end-to-end traffic engineering use-cases spanning across data centers and the core/access networks.

To implement link-level BGP neighbor discovery, BGP routers multicast UDP-based Hello messages on every link. In the message, the UDP destination port is encoded as a predetermined value (such as 179) and a destination address in the IP header of the multicast packets is encoded as an "all routers on this subnet" group multicast address. For example, the group multicast address can be encoded as 224.0.0.2 in the IPv4 case and FF02::2 in the IPv6 case. The IP source address is set to the address of the interface over which the message is sent out.

Some embodiments of the BGP Hello message include one or more of the following:
  An ASN and BGP Identifier of the sender router.
  Hold Time specifying the time the receiving BGP router maintains its record of Hello messages received from the sending BGP router without receipt of another Hello message.
  One or more TLVs (Type-Length-Value format) describing various other parameters, such as TCP connection specific parameter etc.

When a BGP router receives a Hello message from a directly-connected neighbor on the link, and parameters included in the message are acceptable to the receiving BGP router, then the receiving BGP router establishes an adjacency with the neighbor. Once an adjacency is established, the BGP routers establish a TCP connection, followed by the establishment of the BGP session atop the TCP connection. This approach is used to discover peering relationships with directly-connected routers. For example, the routers 201-204, 206, 207, 211-214, 216, 217 in the 5-stage Clos network 200 are implemented as BGP routers without any explicit configuration of an e-BGP peering with any neighboring router. Each of the routers 201-204, 206, 207, 211-214, 216, 217 multicasts BGP Hellos on its links in the 5-stage Clos network 200. The neighboring BGP routers discover each other automatically via exchange of the Hello messages. For example, the routers 201 and 206 multicast BGP Hellos on the link that connects them. As a result, the routers 201 and 206 discover each other and learn the parameters required to establish an e-BGP session between them. An adjacency is formed between the routers 201 and 206 and then a BGP session is established using the parameters associated with the adjacency. This approach to neighbor discovery has drawbacks when multiple BGP routers are interconnected by a broadcast multi-access network such as an ethernet LAN.

As discussed herein, conventional BGP neighbour discovery is limited to discovering neighbors directly connected over a link, which introduces several drawbacks. Consequently, the routers (such as the routers 101-109 shown in FIG. 1 and the routers 201-204, 206, 207, 211-214, 216, and 217 shown in FIG. 2) implement targeted neighbor discovery to allow the routers to discover routers that are more than one network hop away from each other. Targeted neighbor discovery is used to learn the characteristics of the neighbor routers to make appropriate decisions for setting up a BGP session with the neighbour routers. For example, targeted neighbor discovery addresses the following problems in multi-hop BGP peering.

First, conventional BGP peering requires pre-provisioning of fixed transport parameters in the routers. For example, conventional BGP peering can require pre-provisioning the IP addresses that are used to establish a TCP connection between peers. This becomes a problem in the following scenarios involving different transport parameters:
  1) A peer supports dual stack network protocols (e.g., IPv4 and IPv6) but the peer prefers to use one or the other of the network protocols. Furthermore, the peer can dynamically change its network protocol preference. If one of the routers has 100 peering sessions and if every peer changes its preference, then the router needs to update configurations to each of the 100 peers. Similarly, if one of the routers makes a local change to its preference, then each of the 100 peers need to update their configuration.
  2) Some embodiments of the routers do not use the same local IP address across connections in all peering sessions for security reasons. For example, the router 201 can select a local IP address based on the location, network, or AS that a peer router belongs to.

BGP does not support a mechanism to negotiate the transport parameters prior to establishment of the TCP connection between multi-hop BGP peers. Consequently, some embodiments of the routers implement a discovery mechanism to negotiate IP address(es) to be used for TCP connection.

Second, single-sided provisioning is not possible in conventional BGP. For example, single-sided provisioning is used to establish a router within an AS as a BGP Route Reflector to reduce the number of i-BGP (internal BGP) peerings required in the AS. In some embodiments, every i-BGP router has a i-BGP peering with every other i-BGP router in the AS, which leads to full-mesh of i-BGP sessions among the i-BGP routers. To avoid the full mesh, a single router (or two for redundancy) is established as a route reflector and other routers in the AS are configured as peers to the route reflector. A route reflector therefore offers an alternative to a logical full-mesh requirement of an i-BGP. The route reflector acts as a focal point for i-BGP sessions and the purpose of the route reflector is concentration of the traffic involving the routers within the AS. For example, multiple i-BGP routers can peer with a central point implemented at the route reflector—acting as a route reflector server—rather than peer with every other router in a full mesh. The other i-BGP routers become clients to the route reflector. In a large scale i-BGP network, the route reflector is configured with (at least) the IP addresses of each of the client routers for establishing peering relationships between the route reflector and the client routers. Instead of configuring the route reflector for each potential client, some embodiments of the routers are configured to automatically discover a client (when operating as a route reflector) and negotiate transport parameters for a peering session with the client. When operating as a client to the route reflector, the routers are configured to negotiate transport parameters for peering sessions with the route reflector based on targeted discovery messages transmitted by the route reflector.

Conventional multi-hop BGP does not support negotiating different transport protocols (e.g., transport protocols other than TCP) as the underlying mechanism for the BGP session because of the absence of discovery mechanism prior to the establishment of the BGP session. Consequently, the routers unicast targeted neighbor discovery messages prior to establishment of the BGP session and the targeted neighbor discovery messages are used to negotiate the underlying transport protocol.

To implement targeted neighbor discovery, routers (such as the routers 101-109 shown in FIG. 1 listen on a local IP address for Hello messages that are unicast from potential neighbor routers that are multiple routing hops away in the network. The router is also configured to unicast periodic Hello messages to the IP address of potential neighbor routers. The neighbor routers are listening for the unicast Hello messages on their corresponding IP addresses. The Hello messages are referred to herein as "targeted Hello messages." The targeted Hello messages carry various parameters for negotiation of a multi-hop BGP session. Upon receipt of a targeted Hello message from a neighbor, a router evaluates the parameters included in the message. If the parameters are acceptable, then the router forms a targeted adjacency with the neighbour. If the parameters are not acceptable, the router can negotiate a different set of parameters by exchanging additional messages until an acceptable set of parameters is identified or the attempt to form the adjacency fails. After formation of the targeted adjacency, the router and the neighbor router establish a TCP connection based on the negotiated parameters. Examples of the negotiated parameters include IP addresses to be used in the TCP connection and the like. Formation of a new adjacency is followed by establishment of a BGP session with the adjacent neighbour.

In some embodiments, targeted neighbor discovery is used to support single-sided provisioning. In a single-sided provisioning scenario, one router is configured as a "passive" router and other routers in the network are configured as "active" routers. Only the active BGP routers are configured to initiate BGP peering by unicasting periodic targeted Hellos to the IP address in the (passive) neighbor router, which is listening for Hello messages on its IP address. The passive BGP router is not configured to unicast targeted Hellos to potential neighbors and remains unaware of any potential neighbor (e.g., the router is in a zero configuration) until it receives a targeted Hello message from the potential neighbor. In response to receiving a targeted Hello from a neighbour, the passive BGP router evaluates the parameters included in the targeted Hello message. If the parameters are acceptable to the passive BGP router, a targeted adjacency is formed with the neighbour (i.e., the active BGP router) and the passive BGP router starts unicasting targeted Hellos to the neighbour. Some embodiments of the passive BGP router are used to implement a route reflector for a set of routers in an ASN.

Only one targeted Hello adjacency should exist between two peering routers that form the adjacency using targeted Hello messages. Thus, there is a 1:1 mapping of the neighboring routers to the adjacency. Once the BGP session is operational between two targeted peers, periodic session keep-alive messages are used to maintain the liveliness of the BGP session. In some embodiments, the targeted Hello messages exchanged by the routers become redundant after the BGP session has been operational for an extended duration. The BGP session keep-alive messages serve the intent of each router to maintain its adjacency to its peer. The overhead and bandwidth consumed by transmitting targeted Hello messages to all neighbours at periodic intervals becomes significant and potentially burdensome when a router maintains numerous BGP sessions to neighbours. For example, the overhead and bandwidth consumed by transmitting the targeted Hello messages can negatively impact the performance of a router that maintains BGP sessions to large number of i-BGP routers.

Targeted hello adjacencies are also vulnerable to Denial of Service (DoS) attacks. For example, existing targeted hello adjacencies can get lost due to a DoS attack that transmits spurious Hello packets to a targeted receiving router. Unlike TCP sessions, it is not always possible to provide per-peer protection for universal datagram protocol (UDP) based Hello messages. Existing authentic adjacencies can be protected while throttling spurious adjacencies, but the necessary hardware, firmware, or software may not be available in low cost routers. Consequently, the targeted Hellos should not be dependent on maintenance of Targeted BGP adjacency, at least to the degree possible. Reducing the number of necessary targeted Hello messages can maintain the resilience of the targeted Hello adjacencies during sporadic Hello attacks. In some embodiments, the routers implement targeted hello reduction to reduce the rate of exchange of targeted Hellos after BGP session is established between peering routers. In some cases, the routers turn off the exchange of targeted Hello messages if a duration of the BGP session exceeds a threshold duration. The routers can also transmit updated information in response to modifications of the router's configuration, which is performed by sending targeted Hello messages at normal frequency or, if the exchange of targeted Hello messages has been turned off, resuming transmission of the targeted Hello messages.

Figure 3:
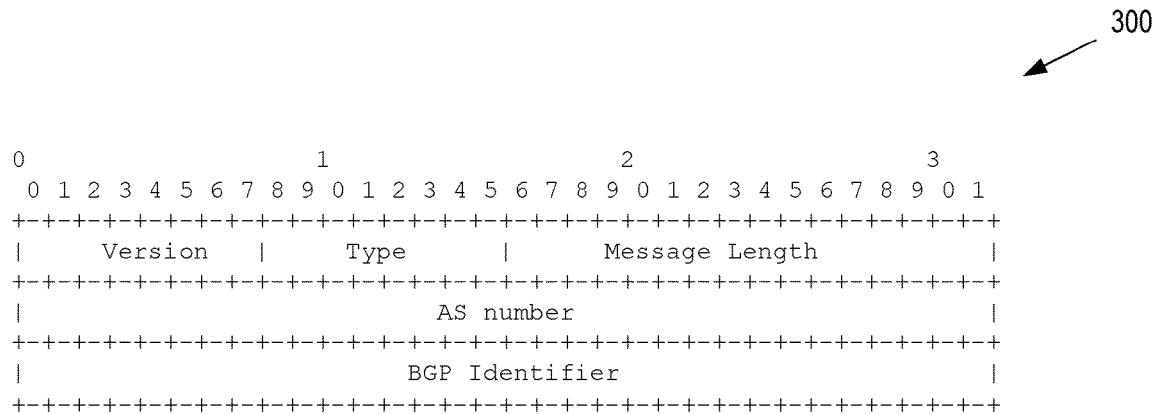
FIG. 3 is a BGP user datagram protocol (UDP) message header that is used in targeted Hello messages for neighbor discovery according to some embodiments.

FIG. 3 is a BGP user datagram protocol (UDP) message header 300 that is used in targeted Hello messages for neighbor discovery according to some embodiments. The targeted Hello messages use UDP messages that include a predetermined destination port number such as the destination port number 179. The targeted Hello messages also include the BGP UDP message header 300, which includes the following fields:

Version: This 1-octet unsigned integer indicates the protocol version number of the message. In some embodiments, the BGP version number is 4.

Type: The type of BGP message. In some embodiments, the targeted Hello message is assigned type 1.

Message Length: a 2-octet unsigned integer that specifies the length in octets of the entire BGP UDP message including the header 300.

AS number: AS Number of the UDP message sender.

BGP Identifier: BGP Identifier of the UDP message sender.

The BGP UDP messages including the BGP UDP message header 300 can be sent using either IPv4 or IPv6 depending on the address.

Figure 4:
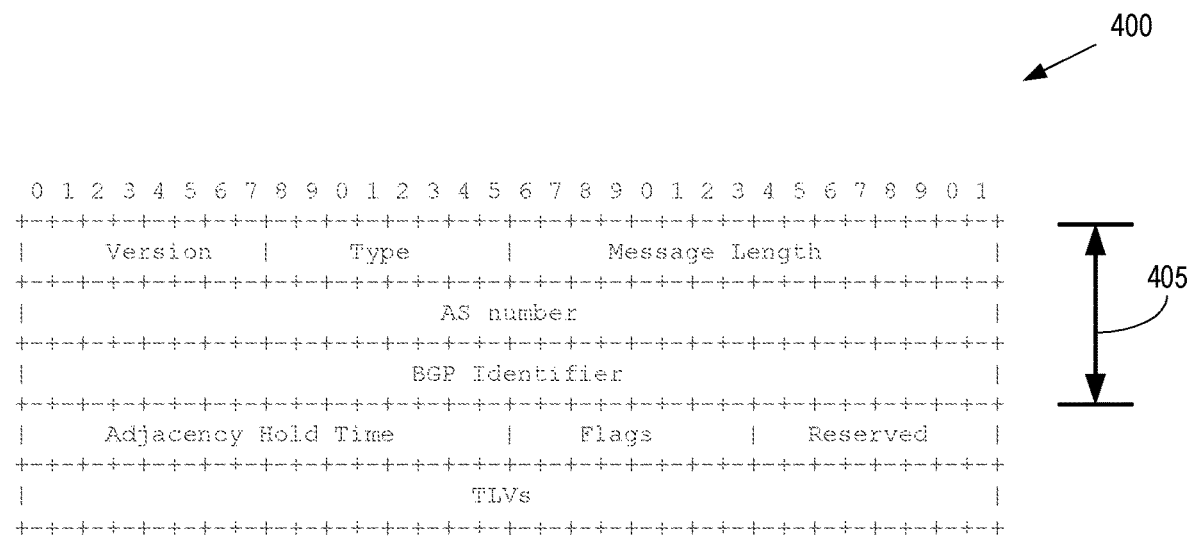
FIG. 4 is a BGP Hello message that is used to send targeted Hello messages for neighbor discovery according to some embodiments.

FIG. 4 is a BGP Hello message 400 that is used to send targeted Hello messages for neighbor discovery according to some embodiments. The BGP Hello message 400 includes a message header 405 such as the BGP UDP message header 300 shown in FIG. 3. The BGP Hello message 400 also includes the following fields:

Adjacency Hold Time: Hello adjacency hold timer in seconds. The Adjacency Hold Time specifies the time or duration that the receiving BGP neighbor router maintains the adjacency state without receipt of another Hello. A value of 0 means that the receiving BGP peer should immediately mark that the adjacency to the sender is about to be discontinued or interrupted.

Figure 5:
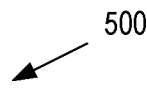
FIG. 5 illustrates a set of flags included in a BGP Hello message according to some embodiments.

Flags: the defined bits in the flags field are shown in FIG. 5. Other undefined bits should be cleared by senders and ignored by the receiver.

TLVs: This field contains one or more TLVs (Type-Length-Value), e.g., as illustrated in FIG. 6.

FIG. 5 illustrates a set of flags 500 included in a BGP Hello message according to some embodiments. The set of flags 500 is included in some embodiments of the BGP Hello message 400 shown in FIG. 4. The set of flags 500 includes an S-bit that, when SET, indicates that the Hello message is a state change message and, when CLEAR, indicates that the Hello message is a normal periodic message. For example, based on the setting of the S-bit flag, the Hello message has the following variants:
1. State Change Hello Message: these Hello messages include TLVs which convey the state and parameters of the local interface and adjacency to other routers on the link. They are generated only when there is a change in state of the adjacency or some parameter at the interface level.
2. Periodic Hello Message: these are the normal periodic Hello messages which do not include TLVs and are used to maintain the adjacency on the link during steady state conditions.

The reserved bits in the set of flags 500 are set to 0 by the sender and are ignored by the receiver.

Figure 6:
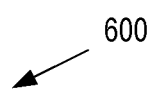
FIG. 6 illustrates a type-length-value (TLV) format according to some embodiments.

FIG. 6 illustrates a type-length-value (TLV) format 600 according to some embodiments. The TLV format is used for TLVs that are included in some embodiments of the BGP Hello message 400 shown in FIG. 4. The TLV format 600 includes the following fields:
Type—16-octet field that indicates the type of TLV.
Length—16-octet field that indicates length of the Value field in units of octets.
Value: The variable sized type dependent value field.

Some embodiments of the Hello message carry one or more of the following six TLVs.

1) Accepted ASN List TLV

A TLV that is used to signal an unordered list of AS numbers from which the BGP router would accept BGP sessions. The accepted ASN list TLV is not necessarily signaled in some embodiments. When not signaled, it indicates that the router accepts BGP peering from any ASN from its neighbors. Indicating the list of ASNs helps avoid the neighbor discovery process getting stuck in a 1-way state where one side keeps attempting to setup adjacency while the other does not accept it due to incorrect ASN.

2) Peering Address TLV

The Peering Address TLV is used to indicate to the neighbor the address to be used for setting up the BGP TCP session. Along with the peering address, the router can specify its supported route types (AFI/SAFI(s)). When the AFI/SAFI values are specified as 0/0, then it indicates that the neighbor can attempt for negotiation of any AFI/SAFIs. Multiple instances of this TLV may be included in the Hello message, one for each peering address, e.g., IPv4 and IPv6 or multiple IPv4 addresses for different AFI/SAFI sessions.

3) Local Prefix TLV

Some embodiments of the BGP neighbor discovery mechanism require a BGP router to program a route in its local routing table for a prefix belonging to its neighbor router. One such scenario is when the BGP TCP peering is to be setup between the loopback addresses on the neighboring routers. As used herein, the term "loopback address" refers to an address that allows a device to send and receive its own data packets. This requires that the routers have reachability to each other's loopback addresses before the TCP session can be brought up. The Local Prefix TLV is a TLV that enables a BGP router to explicitly signal its local prefix to its neighbor for setting up of such a local routing entry pointing over the underlying link over which it is being signaled.

4) Link Attributes TLV

The Link Attributes TLV is included in a State Change Hello message that signals to the neighbor the link attributes of the interface on the local router. One instance of this TLV is included in the State Change Hello message. A State Change Hello message without this TLV included is discarded and an error logged for the same. This TLV enables a BGP router to learn all its neighbors IP addresses on the specific link as well as its link identifier.

5) Neighbor TLV

The Neighbor TLV is used by a BGP router to indicate its Hello adjacency state with its neighboring router(s) on the specific link. The neighbor is identified by its AS Number and BGP Identifier. The router includes the Neighbor TLV for each of its discovered neighbors on that link irrespective of its status.

6) Cryptographic Authentication TLV

The Cryptographic Authentication TLV is used in some embodiments as part of an authentication mechanism for BGP Hello message by securing against spoofing attacks.

Figure 7:
FIG. 7 illustrates a set of flags including additional bits that characterize a BGP Hello message according to some embodiments.

FIG. 7 illustrates a set of flags 700 including additional bits that characterize a BGP Hello message according to some embodiments. The set of flags 700 is included in some embodiments of the BGP Hello message 400 shown in FIG. 4. In addition to the S-bit discussed herein with regard to FIG. 5, the set of flags 700 includes:
Targeted Hello bit, T. A value of 1 specifies that this Hello message is a Targeted Hello. A value of 0 specifies that this Hello message is a Hello message sent directly between routers over a single link.
Request Send Targeted Hellos bit, R. A value of 1 requests the receiver to send periodic Targeted Hellos to the source of this Hello message. A value of 0 makes no request.

A router such as a label switched router (LSR) that initiates targeted multi-hop neighbor discovery sets the value of R to 1. If R is 1, the receiving router, such as another LSR, the router checks whether it has been configured to send targeted Hello messages to the Hello source in response to Hello messages with this request. If not, the router ignores the request. If so, it initiates periodic transmission of Targeted Hellos to the Hello source.

Figure 8:
FIG. 8 illustrates a configuration sequence number TLV according to some embodiments.

FIG. 8 illustrates a configuration sequence number TLV 800 according to some embodiments. The configuration sequence number TLV 800 is included in some embodiments of the BGP Hello message 400 shown in FIG. 4. The Type field in the configuration sequence number TLV 800 is assigned a value 7. The value of the Length field in the configuration sequence number TLV 800 is 4-octets. In the illustrated embodiment, the value field carries a 4-octet unsigned configuration sequence number that identifies the configuration state of the sending BGP Router. The configuration sequence number TLV 800 is used by the receiving BGP router to detect configuration changes on the sending BGP router. The configuration sequence number TLV 800 is not limited to targeted discovery but can be used in link-based discovery as well.

When the S-flag is set in a Hello Message, then the sender BGP router includes the configuration sequence number TLV 800. The configuration sequence number TLV 800 is applicable irrespective of Link Hello or Targeted Hello. For targeted discovery, the Hello Message is sent on the UDP message with a predetermined destination port number (such as the destination port 179) to a unicast destination IP address. The TLVs except the Link Attributes TLV may be included in a Targeted Hello Message because the Link Attributes TLV is applicable to Link Hello messages only.

Figure 9:
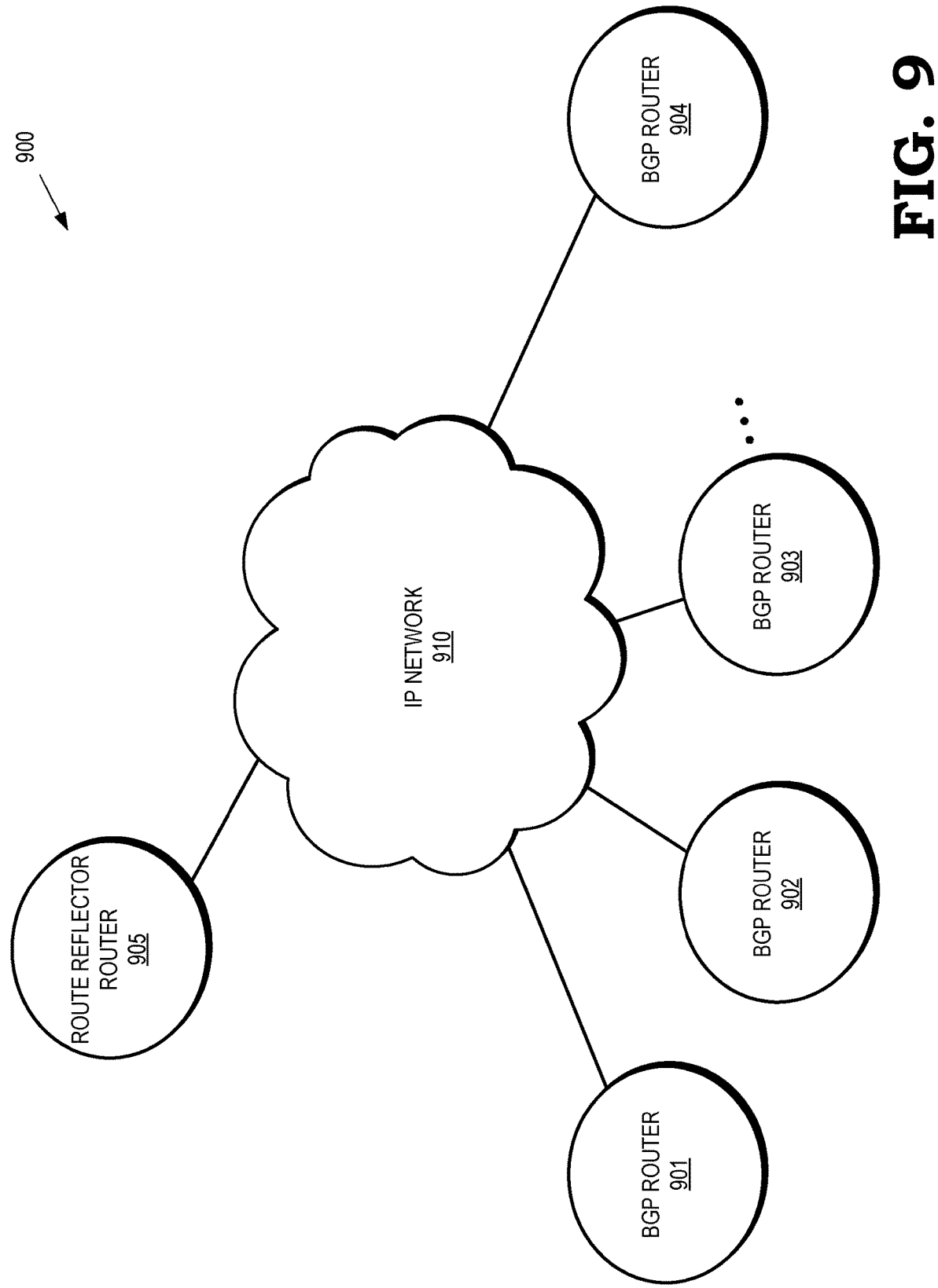
FIG. 9 is a block diagram of a communication system that implements single-sided provisioning between multi-hop BGP routers according to some embodiments.

FIG. 9 is a block diagram of a communication system 900 that implements single-sided provisioning between multi-hop BGP routers according to some embodiments. The communication system 900 includes routers 901, 902, 903, 904, 905 (collectively referred to herein as "the routers 901-905"), which are interconnected by an IP network 910. The router 905 is configured as a "passive" router that does not unicast targeted Hello messages to any potential neighbors. Thus, the passive router 905 is initially unaware of any potential neighbors, e.g., the passive router 905 is in a zero configuration. In some embodiments, the router 905 acts as a route reflector router, as discussed herein. The routers 901-904 are configured as "active" routers that unicast targeted Hello messages to the passive router 905. Upon receipt of a targeted Hello message from one of the neighbor routers 901-904, the passive router 905 evaluates the parameters included in the message. If the parameters are acceptable to the router 905, then a targeted adjacency is formed with the neighbour router 901-904. In response to forming the targeted adjacency, the router 905 begins unicasting targeted Hellos to the neighbour.

The targeted Hello messages are transmitted based on IP addresses associated with the routers 901-905. For example, if the router 901 has an IP address IP-901 and the router 905 has an IP address IP-905, the (passive) router 905 listens on the IP address IP-905 for targeted Hello messages. The (passive) router 905 is not configured initially with a peering relationship with any of the routers 901-904. The router 901 transmits targeted Hello messages periodically (or at other time intervals) to the (passive) router 905 on the IP address IP-905. In response to receiving a targeted Hello message from the router 901 on the IP address IP-905, the router 905 forms a targeted adjacency with the router 901. The router 905 then begins transmitting targeted Hello messages periodically to the router 901 on the IP address IP-901. At this point, the router 905 has discovered the router 901. The router 905 can interrupt transmission of targeted Hello messages to the router 901 on the IP address IP-901 in response to the adjacency to the router 901 being discontinued or interrupted. Thus, single-cited provisioning allows additional removal of routers 901-904 without an explicit peering configuration in the router 905.

Some embodiments of the routers 901-905 implement targeted Hello message reduction based on information included in an Adjacency Hold Time field in the targeted Hello messages such as the BGP Hello message 400 shown in FIG. 4. The Adjacency Hold Time value of 0xffff is defined to mean infinite hold time. A pair of peering routers (such as the routers 901 and 905) perform targeted Hello message reduction as follows:

1) A BGP Router starts transmitting periodic targeted hellos to its neighbour to establish the targeted hello adjacency. Each BGP router proposes its configured Adjacency Hold Time in its Targeted Hello message to the neighbour.
2) If the Targeted Hello is acceptable by receiving BGP router, it establishes targeted hello adjacency with the source BGP router, which is followed by establishment of BGP session.
3) After the BGP session is operational, each BGP router may start proposing "relaxed" hold time (higher than configured) in Adjacency Hold Time field in the subsequent Targeted Hello Messages. The routers 901-905 increase the advertised hold time by a predetermined (or dynamically determined) factor after sending a set of Hello messages, e.g., after sending 5 Hello messages that advertise a consistent hold time. As the process of relaxing the advertised hold time continues, e.g., after a time interval that exceeds a threshold duration, a BGP router reaches the maximum hold time value of 0xffff. Thus, after the session is operational, the hold time between the routers 901-905 gets negotiated to infinite. Note that the Targeted Hello Adjacency continues to exist and only the adjacency hold times are now infinite.
4) If there are any changes in any parameters associated with a targeted BGP Hello adjacency (e.g., a change in a Configuration Sequence Number) then an updated Targeted Hello is sent without any changes to the "current" hold time (e.g., infinite) that was advertised in the last Hello Message. Since BGP hellos are not reliable, the routers 901-905 may send a set of hellos (e.g., a set of five messages) at configured intervals (or faster) to reflect the change. The Hello messages continue to advertise infinite hold time and then fall back to a reduced transmission rate after the packets are sent.
5) If the BGP session between two of the routers 901-905 fails, leading to tearing down of adjacency, then each router 901-905 reverts to advertising their configured Adjacency Hold Time and repeats the procedure outlined in steps 1-3 above. This also applies when a BGP session restarts gracefully when peering BGP routers are graceful restart capable. Thus, the reduction procedures allow an operator to configure a very aggressive Adjacency Hold Time to expedite bringing up a large number of BGP sessions in the event of failure but reduces the overhead of hello adjacency maintenance when sessions are operational. Aggressive Adjacency Hold Times are configured to tear down spurious hello adjacencies more rapidly.
6) When a neighbour router 901-905 has negotiated an infinite hold time and the neighbour router 901-905 decides to tear down the adjacency, then a local BGP router would not be able to detect that the remote node is no longer accepting Hello messages. Some embodiments of the routers 901-905 therefore send one or more contiguous Hello messages (e.g., a set of 3 Hello messages) advertising an Adjacency Hold Time of zero seconds while bringing down a Targeted Hello adjacency. In some embodiments, a hold time value of zero seconds means that the receiving BGP router should mark that the adjacency to the sender is going down.

In some embodiments, the routers 901-905 are not required to advertise infinite Adjacency Hold Time in Targeted Hellos after a BGP session is established. For example, the routers 901-905 can advertise a value that is significantly larger than configured Adjacency Hold Time. However, utilizing an infinite Adjacency Hold Time after BGP session setup increases the advantages derived from the procedure described above. For example, the BGP routers in FIG. 9 can implement targeted BGP Hello reduction in addition to the single-sided provisioning, which would reduce the burden of router 905 (e.g., the route reflector router) to send and receive large numbers of periodic targeted Hello messages.

Figure 10:
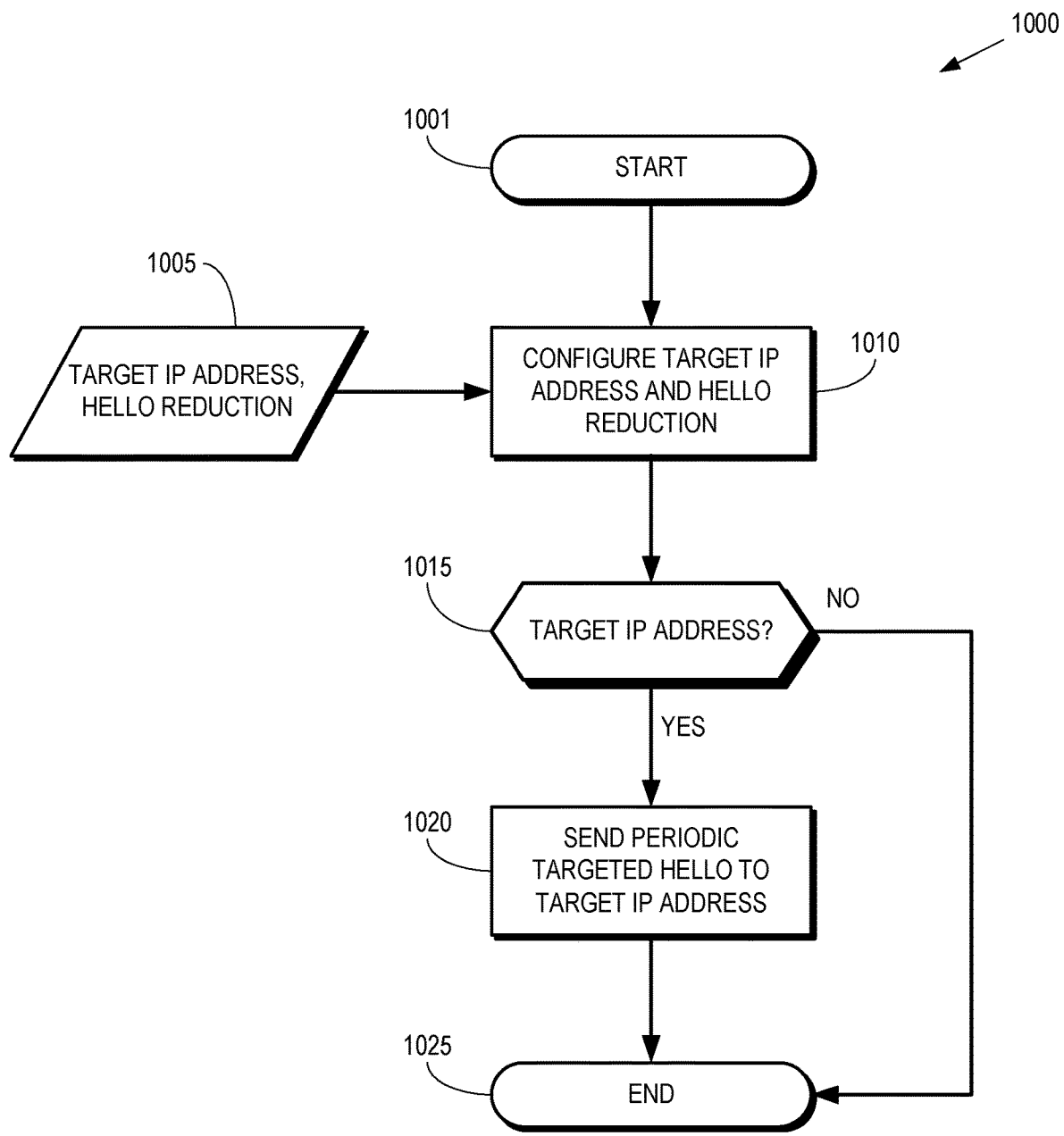
FIG. 10 is a flow diagram of a method for configuring routers to perform targeted neighbor discovery according to some embodiments.

FIG. 10 is a flow diagram of a method 1000 for configuring routers to perform targeted neighbor discovery according to some embodiments. The method 1000 is implemented in a router in some embodiments of the network 100 shown in FIG. 1, the 5-stage Clos network 200 shown in FIG. 2, and the communication system 900 shown in FIG. 9.

The method 1000 begins at the block 1001. The input 1005 includes a target IP address of the neighbor router, which indicates where the router is to send targeted Hello messages. If the target IP address is not provided, then it means the router is playing the passive role in single-sided provisioning scheme. For example, the target IP address is not provided by the router 905 shown in FIG. 9. The input 1005 also includes a Hello reduction variable, which is a Boolean variable. If the Hello reduction variable is set to TRUE, then targeted Hello reduction techniques are applied to the neighbor router or, if the target IP address is not provided and the router is operating in the passive mode, the targeted Hello reduction techniques are applied to all potential neighbor routers. Targeted Hello reduction is not applied if the Hello reduction variable is set to FALSE.

At block 1010, the router stores the target IP address and the Hello reduction variable for future reference. At decision block 1015, the router determines whether the target IP address was provided. If so, the method 1000 flows to the block 1020. Otherwise, the method flows to the block 1025 and the method 1000 ends.

At block 1020, the router begins sending targeted Hello messages to the target IP address. The targeted Hello messages are sent periodically, at predetermined time intervals, or in response to one or more events. The method 1000 then flows to the block 1025 and the method 1000 ends.

Figure 11:
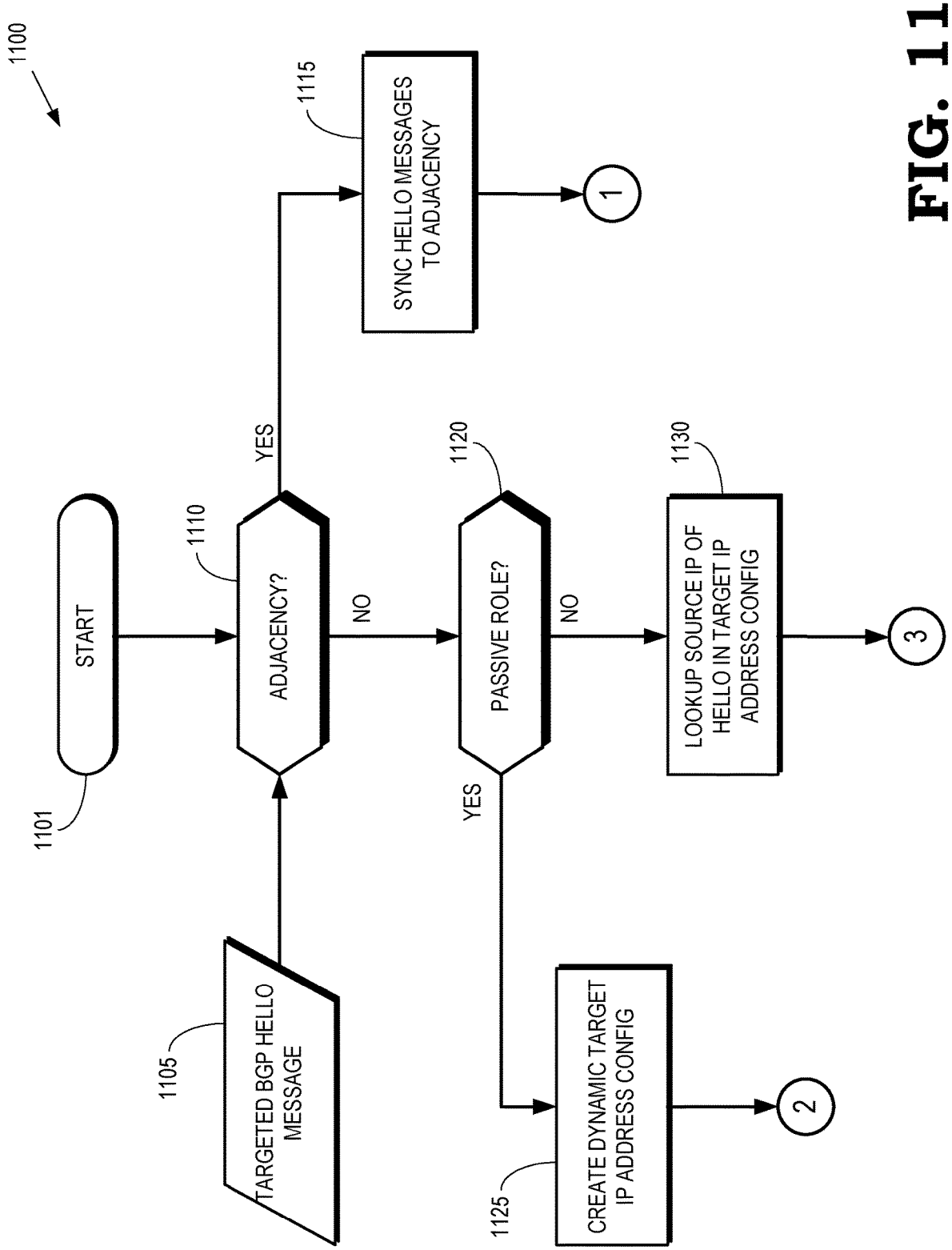
FIG. 11 is a flow diagram of a first portion of a method for processing targeted Hello messages during targeted neighbor discovery according to some embodiments.

FIG. 11 is a flow diagram of a first portion 1100 of a method for processing targeted Hello messages during targeted neighbor discovery according to some embodiments. The method is implemented in a router in some embodiments of the network 100 shown in FIG. 1, the 5-stage Clos network 200 shown in FIG. 2, and the communication system 900 shown in FIG. 9.

The method begins at the block 1101. The input 1105 includes a targeted Hello message received by the router.

At decision block 1110, the router determines whether a targeted Hello adjacency exists with the identifier included in the targeted Hello message. In some embodiments, the identifier is an IP address associated with the router that transmitted the targeted Hello message. If an adjacency exists, the method flows to the block 1115. If no adjacency exists, the method flows to the decision block 1120.

At block 1115, the router syncs up the parameters in the Hello message to the adjacency. In some embodiments, the parameters include an adjacency hold time, a configuration sequence number, and the like. The method then flows to the node 1, which connects to the block 1205 in FIG. 12.

At decision block 1120, the router determines whether it is configured in a passive role, such as a reflector router in a single-sided provisioning scheme. If the router is configured in a passive role, the method flows to the block 1125. If the router is configured in an active role, the method flows to the block 1130.

At block 1125, the router creates a dynamic target IP address configuration based on the source address in the IP header of the received targeted Hello message. The method then flows to the node 2, which connects to the block 1210 in FIG. 12.

At block 1130, the router looks up the source address in the IP header of the targeted Hello message among the targeted IP addresses configured in the router. The method then flows to the node 3, which connects to the decision block 1215 in FIG. 12.

Figure 12:
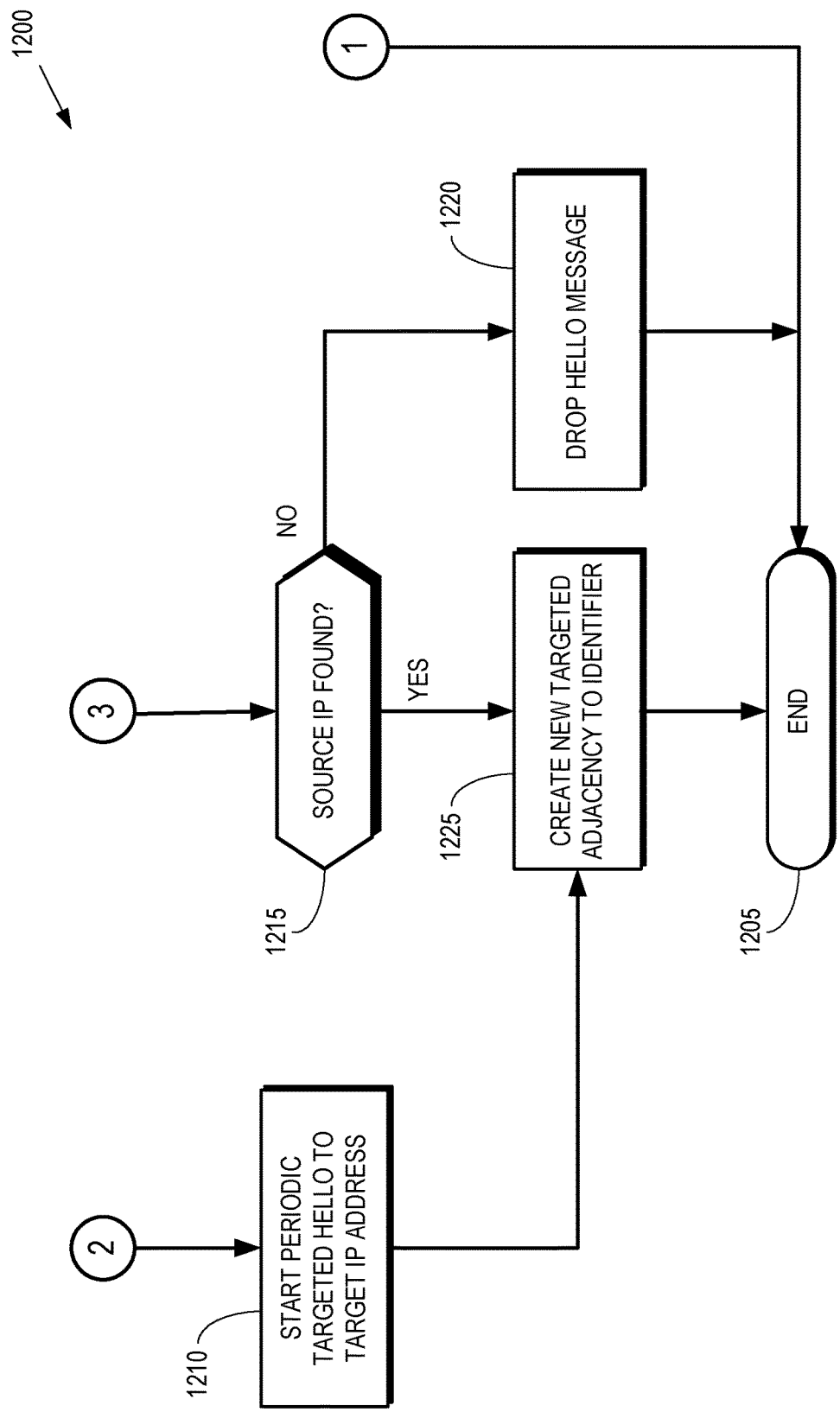
FIG. 12 is a flow diagram of a second portion of the method for processing targeted Hello messages during targeted neighbor discovery according to some embodiments.

FIG. 12 is a flow diagram of a second portion 1200 of the method for processing targeted Hello messages during targeted neighbor discovery according to some embodiments. The node 1 connects the block 1115 shown in FIG. 11 to the termination block 1205. The node 2 connects the block 1125 shown in FIG. 11 to the block 1210. The node 3 connects the block 1130 shown in FIG. 11 to the decision block 1215.

At decision block 1210, the router starts sending periodic targeted Hello messages to targeted IP address of the remote router.

At decision block 1215, the router determines whether the source address in the IP header of the targeted Hello message matches one of the targeted IP addresses configured in the router. If not, the method flows to the block 1220. If the source address matches one of the targeted IP addresses configured in the router, the method flows to the block 1225.

At block 1220, the router drops the targeted Hello message because there is no matching target IP address. The method then flows to the block 1205 and the method ends.

At block 1225, the router creates a new targeted Hello adjacency to the identifier included in the received targeted Hello message. In some embodiments, the identifier is an IP address associated with the router that transmitted the targeted Hello message. The router also triggers the establishment of a BGP session based on the parameters negotiated by the adjacency. For example, if Peering Address TLV(s) are received in the targeted Hello message, then a TCP connection is established to the IP address specified in each Peering Address TLV. If no Peering Address TLV(s) are received, then a TCP connection is established to the source address in the IP header of the targeted Hello message. In either case, a corresponding BGP session is established using the TCP connection. The method then flows to the block 1205 and the method ends.

Figure 13:
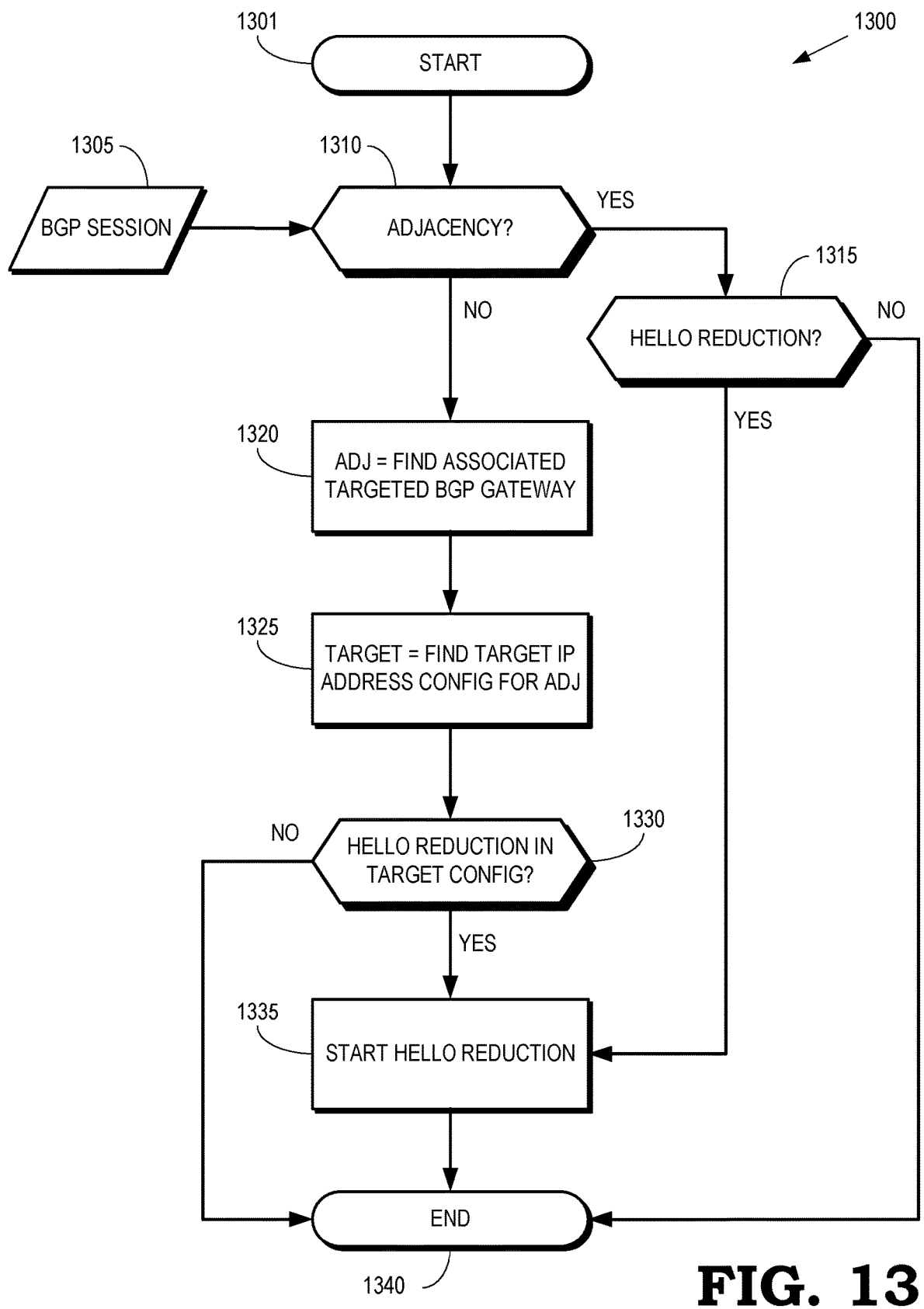
FIG. 13 is a flow diagram of a method for performing targeted Hello message reduction in response to establishing a multi-hop BGP session according to some embodiments.

FIG. 13 is a flow diagram of a method 1300 for performing targeted Hello message reduction in response to establishing a multi-hop BGP session according to some embodiments. The method 1300 is implemented in a router in some embodiments of the network 100 shown in FIG. 1, the 5-stage Clos network 200 shown in FIG. 2, and the communication system 900 shown in FIG. 9.

The method begins at the block 1301. The input 1305 includes information indicating a multi-hop BGP session that is operational.

At block 1310, the router determines whether it is operating in a passive role in a single-sided provisioning scheme. If so, the method flows to decision block 1315. If the router is operating in an active role, the method flows to the block 1320.

At decision block 1315, the router determines whether it is configured for targeted Hello reduction to its auto-discovered neighbors. If so, the method 1300 flows to the block 1335. Otherwise, the method 1300 flows to the block 1340 and the method 1300 ends.

At block 1320, the router identifies the targeted Hello adjacency associated with the session. At block 1325, the router determines a parent target IP address configuration that bootstraps the adjacency.

At decision block 1330, the router determines whether targeted Hello reduction is configured in the target IP address configuration. If not, the method 1300 flows to the block 1340 and the method 1300 ends. If targeted Hello reduction is configured, the method 1300 flows to the block 1335.

At block 1335, the router begins targeted Hello reduction on the targeted Hello message is sent to the target IP address. As discussed herein, performing targeted Hello reduction includes exchanging targeted neighbor discovery messages between the routers to indicate that the adjacency is active. A frequency of the targeted neighbor discovery messages is reduced in response to a duration of the session increasing. In some embodiments, transmission of the targeted neighbor discovery messages is turned off in response to the duration of the session exceeding a threshold duration. Transmission of the targeted neighbor discovery messages can subsequently be turned on if necessary.

Figure 14:
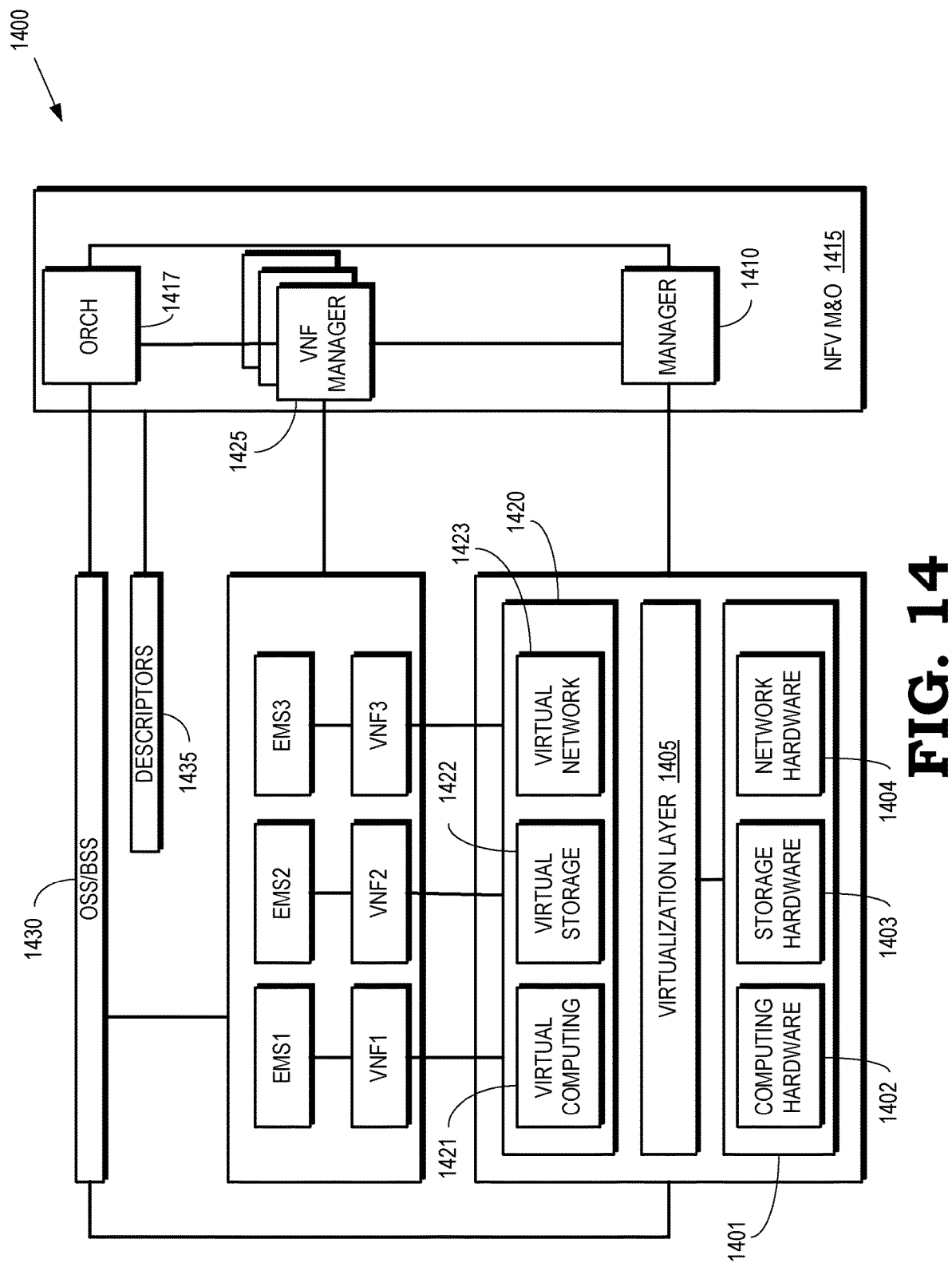
FIG. 14 is a block diagram of a network function virtualization (NFV) architecture that supports targeted Hello messages for multi-hop neighbor discovery according to some embodiments.

FIG. 14 is a block diagram of a network function virtualization (NFV) architecture 1400 that supports targeted Hello messages for multi-hop neighbor discovery according to some embodiments. The NFV architecture 1400 is used to implement some embodiments of the network 100 shown in FIG. 1, the 5-stage Clos network 200 shown in FIG. 2, and the communication system 900 shown in FIG. 9. The NFV architecture 1400 includes hardware resources 1401 including computing hardware 1402, storage hardware 1403, and network hardware 1404. The computing hardware 1402 is implemented using one or more processors, the storage hardware 1403 is implemented using one or more memories, and the network hardware 1404 is implemented using one or more transceivers, transmitters, receivers, interfaces, and the like.

A virtualization layer 1405 provides an abstract representation of the hardware resources 1401. The abstract representation supported by the virtualization layer 1405 can be managed using a virtualized infrastructure manager 1410, which is part of the NFV management and orchestration (M&O) module 1415. Some embodiments of the manager 1410 are configured to collect and forward performance measurements and events that may occur in the NFV architecture 1400. For example, performance measurements may be forwarded to an orchestrator (ORCH) 1417 implemented in the NFV M&O 1415. The hardware resources 1401 and the virtualization layer 1405 may be used to implement virtual resources 1420 including virtual computing resources 1421, virtual storage resources 1422, and virtual networking resources 1423.

Virtual networking functions (VNF1, VNF2, VNF3) run over the NFV infrastructure (e.g., the hardware resources 1801) and utilize the virtual resources 1420. For example, the virtual networking functions (VNF1, VNF2, VNF3) may be implemented using virtual machines supported by the virtual computing resources 1421, virtual memory supported by the virtual storage resources 1422, or virtual networks supported by the virtual network resources 1423. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 1425 that exchanges information and coordinates actions with the manager 1410 or the orchestrator 1417.

The NFV architecture 1400 may include an operation support system (OSS)/business support system (BSS) 1430. The OSS/BSS 1430 deals with network management including fault management using the OSS functionality. The OSS/BSS 1430 also deals with customer and product management using the BSS functionality. Some embodiments of the NFV architecture 1400 use a set of descriptors 1435 for storing descriptions of services, virtual network functions, or infrastructure supported by the NFV architecture 1400. Information in the descriptors 1435 may be updated or modified by the NFV M&O 1415.

The NFV architecture 1400 implements network slices that provide control plane functions or user plane functions. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 1800 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
   at least one processor; and
   at least one memory including instructions that, when executed by the at least one processor, cause the apparatus at least to perform:
      receiving, at a first router from a second router that is multiple network hops away from the first router, a border gateway protocol hello message including an autonomous system number of the second router, a border gateway protocol identifier of the second router, and a set of flags, wherein the set of flags includes a first flag set to a value indicative that the border gateway protocol hello message is a state change hello message, a second flag set to a value indicative that the border gateway protocol hello message is a targeted border gateway protocol hello message, and a third flag set to a value indicative that the second router is requesting that the first router send periodic targeted border gateway protocol hello messages to the second router;
      establishing, by the first router based on the targeted border gateway protocol hello message, a border gateway protocol adjacency between the first router and the second router;
      establishing, by the first router based on the border gateway protocol adjacency, a transport layer connection between the first router and the second router; and
      establishing, by the first router based on the transport layer connection, a border gateway protocol session between the first router and the second router.

2. The apparatus of claim 1, wherein the targeted border gateway protocol hello message is received by the first router based on monitoring of an Internet Protocol (IP) address by the first router.

3. The apparatus of claim 1, wherein the targeted border gateway protocol hello message includes at least one of a transport layer parameter or an identifier of a routing protocol associated with the second router.

4. The apparatus of claim 1, wherein the first router is a route reflector router within an autonomous system (AS) that comprises the second router.

5. An apparatus, comprising:
   at least one processor; and
   at least one memory including instructions that, when executed by the at least one processor, cause the apparatus at least to perform:
      sending, by a first router toward a second router that is multiple network hops away from the first router, a border gateway protocol hello message including an autonomous system number of the first router, a border gateway protocol identifier of the first router, and a set of flags, wherein the set of flags includes a first flag set to a value indicative that the border gateway protocol hello message is a state change hello message, a second flag set to a value indicative that the border gateway protocol hello message is a targeted border gateway protocol hello message, and a third flag set to a value indicative that the first router is requesting that the second router send periodic targeted border gateway protocol hello messages to the first router;
      establishing, by the first router based on the targeted border gateway protocol hello message, a border gateway protocol adjacency between the first router and the second router;
      establishing, by the first router based on the border gateway protocol adjacency, a transport layer connection between the first router and the second router; and
      establishing, by the first router based on the transport layer connection, a border gateway protocol session between the first router and the second router.

6. The apparatus of claim 5, wherein the targeted border gateway protocol hello message includes a border gateway protocol hello message.

7. The apparatus of claim 5, wherein the second router comprises a route reflector (RR).

8. An apparatus, comprising:
   at least one processor; and
   at least one memory including instructions that, when executed by the at least one processor, cause the apparatus at least to perform:
      receiving, at a first router from a second router, a targeted border gateway protocol hello message including a border gateway protocol identifier of the second router and an Internet Protocol address of the second router;

determining, at the first router based on the border gateway protocol identifier of the second router, that the first router does not have a border gateway protocol adjacency with the second router;

determining, at the first router, that the Internet Protocol address of the second router is included in a set of target Internet Protocol addresses configured on the first router; and establishing, by the first router based on the Internet Protocol address of the second router being included in the set of target Internet Protocol addresses configured on the first router, a targeted border gateway protocol adjacency with the second router based on the border gateway protocol identifier of the second router.

\* \* \* \* \*